US012643648B2

(12) United States Patent
Hidaka

(10) Patent No.: US 12,643,648 B2
(45) Date of Patent: Jun. 2, 2026

(54) BATTERY SUPPORTING STRUCTURE

(71) Applicant: HONDA MOTOR CO., LTD., Tokyo (JP)

(72) Inventor: Yuichi Hidaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 501 days.

(21) Appl. No.: 18/169,966

(22) Filed: Feb. 16, 2023

(65) Prior Publication Data

US 2023/0271689 A1 Aug. 31, 2023

(30) Foreign Application Priority Data

Feb. 28, 2022 (JP) ................................. 2022-029617

(51) Int. Cl.
*B63H 21/17* (2006.01)
*B60L 50/60* (2019.01)

(52) U.S. Cl.
CPC .............. *B63H 21/17* (2013.01); *B60L 50/66* (2019.02); *B60L 2200/32* (2013.01)

(58) Field of Classification Search
CPC ...... B63H 21/17; B60L 50/66; B60L 2200/32
USPC ............................................................ 440/6
See application file for complete search history.

(56) References Cited

U.S. PATENT DOCUMENTS

| | | | |
|---|---|---|---|
| 2004/0226765 A1* | 11/2004 | Mathews ............ | H01M 50/213 |
| | | | 180/68.5 |
| 2018/0155000 A1 | 6/2018 | Sako | |
| 2023/0291051 A1* | 9/2023 | Klein ....................... | B62J 43/13 |
| 2024/0278681 A1* | 8/2024 | Edman .................... | B63B 32/10 |

FOREIGN PATENT DOCUMENTS

| | | |
|---|---|---|
| DE | 10 2020 100 441 A1 | 7/2021 |
| JP | 2018-92815 A | 6/2018 |

OTHER PUBLICATIONS

German Office Action dated Oct. 21, 2025 issued in corresponding German application No. 10 2023 103 494.4; English translation included (9 pages).

* cited by examiner

*Primary Examiner* — T. Scott Fix
(74) *Attorney, Agent, or Firm* — Rankin, Hill & Clark LLP

(57) ABSTRACT

There is provided a battery supporting structure to be provided in a vessel, the battery supporting structure including a supporting part that supports a battery, wherein the supporting part is movable between below and above a deck of the vessel by rotating around a rotary shaft provided in the vessel.

12 Claims, 4 Drawing Sheets

FIG.4

BATTERY SUPPORTING STRUCTURE

INCORPORATION BY REFERENCE

The present application claims priority under 35 U.S.C. § 119 to Japanese Patent Application No. 2022-029617 filed on Feb. 28, 2022. The content of the application is incorporated herein by reference in its entirety.

BACKGROUND OF THE INVENTION

Field of the Invention

The present invention relates to a battery supporting structure.

Description of the Related Art

There has conventionally been a vessel including a propulsion engine driven by electric power supplied from fuel cells, secondary cells such as a battery, or the like. In such a vessel, a battery is contained in a space inside a hull positioned below a deck (for example, see Japanese Patent Laid-Open No. 2018-92815).

SUMMARY OF THE INVENTION

There has however been a concern of low work efficiency since such a conventional configuration entails an operation that a user on the deck elevates the battery up to on the deck or lowers the battery below the deck in attaching/detaching the battery.

The present invention provides a battery supporting structure capable of improving work efficiency regarding attaching and detaching a battery.

An aspect of the present invention is a battery supporting structure to be provided in a vessel, the battery supporting structure including a supporting part that supports a battery, wherein the supporting part is movable between below and above a deck of the vessel by rotating around a rotary shaft provided in the vessel.

According to an aspect of the present invention, it is possible to improve work efficiency regarding attaching and detaching a battery.

BRIEF DESCRIPTION OF THE DRAWINGS

FIG. 4 is a view showing a terminal joining body.

DETAILED DESCRIPTION OF THE PREFERRED EMBODIMENT

Hereafter, an embodiment of the present invention will be described with reference to the drawings.

Figure 1:
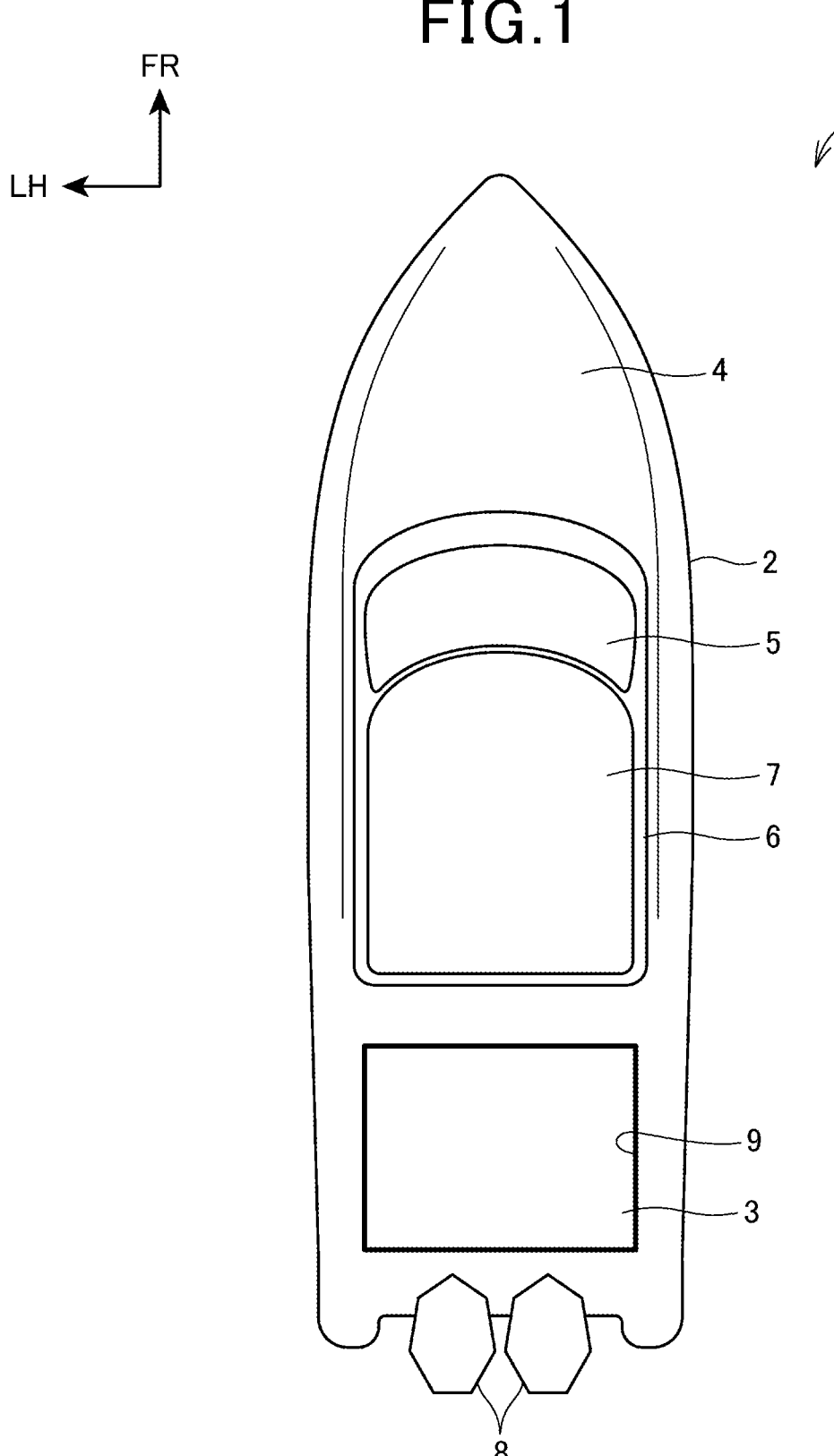
FIG. 1 is a plan view of a vessel 1 according to a present embodiment.

FIG. 1 is a plan view of a vessel 1. In FIG. 1, sign FR denotes a front side of the vessel 1 in the state of being capable of navigating on the water, and sign UP denotes an upper side of the vessel 1, and sign LH denotes a left side of the vessel 1. In the description below, directions are along these directions of the vessel 1, unless otherwise noted.

As shown in FIG. 1, the vessel 1 includes a hull 2 and a deck 4 forming an upper surface of the hull 2. Accordingly, the deck 4 covers an internal space S of the hull 2.

A cabin 6 is provided at substantially the center of vessel 1 in the front-rear direction in plan view of the hull 2. The cabin 6 is a substantially box-shaped structure that is formed to protrude upward from the deck 4 to a predetermined height. A cockpit 5 is provided ahead of the cabin 6. Namely, a front portion of the cabin 6 functions as a so-called bridge. The cabin 6 includes a ceiling 7 forming a ceiling surface of the cabin 6. The ceiling 7 is positioned above the deck 4.

There are provided in a rear portion of the hull 2 outboard engines 8 that function as a propulsion engine of the vessel 1. In the present embodiment, the vessel 1 has a pair of outboard engines 8 at the rear end of the hull 2. The outboard engines 8 are so-called electric outboard motors, which are driven by electric power.

On the deck 4, an opening 9 is provided between the rear end of the hull 2 and the rear end of the cabin 6. The opening 9 is an opening that allows communication between the internal space S and a portion above the deck 4. In the present embodiment, the opening 9 is provided to be rectangular in plan view.

The entire opening 9 is closed by a flat plate-shaped panel 3. When the opening 9 is closed, the panel 3 becomes flush with the upper surface of the deck 4. One side of the panel 3 that is positioned on the rear end portion of the vessel 1 is joined to the deck 4, for example, via a hinge or the like. Thereby, the panel 3 functions as a door member that can be opened and closed by swinging up and down on the upper side of the deck 4.

Figure 2:
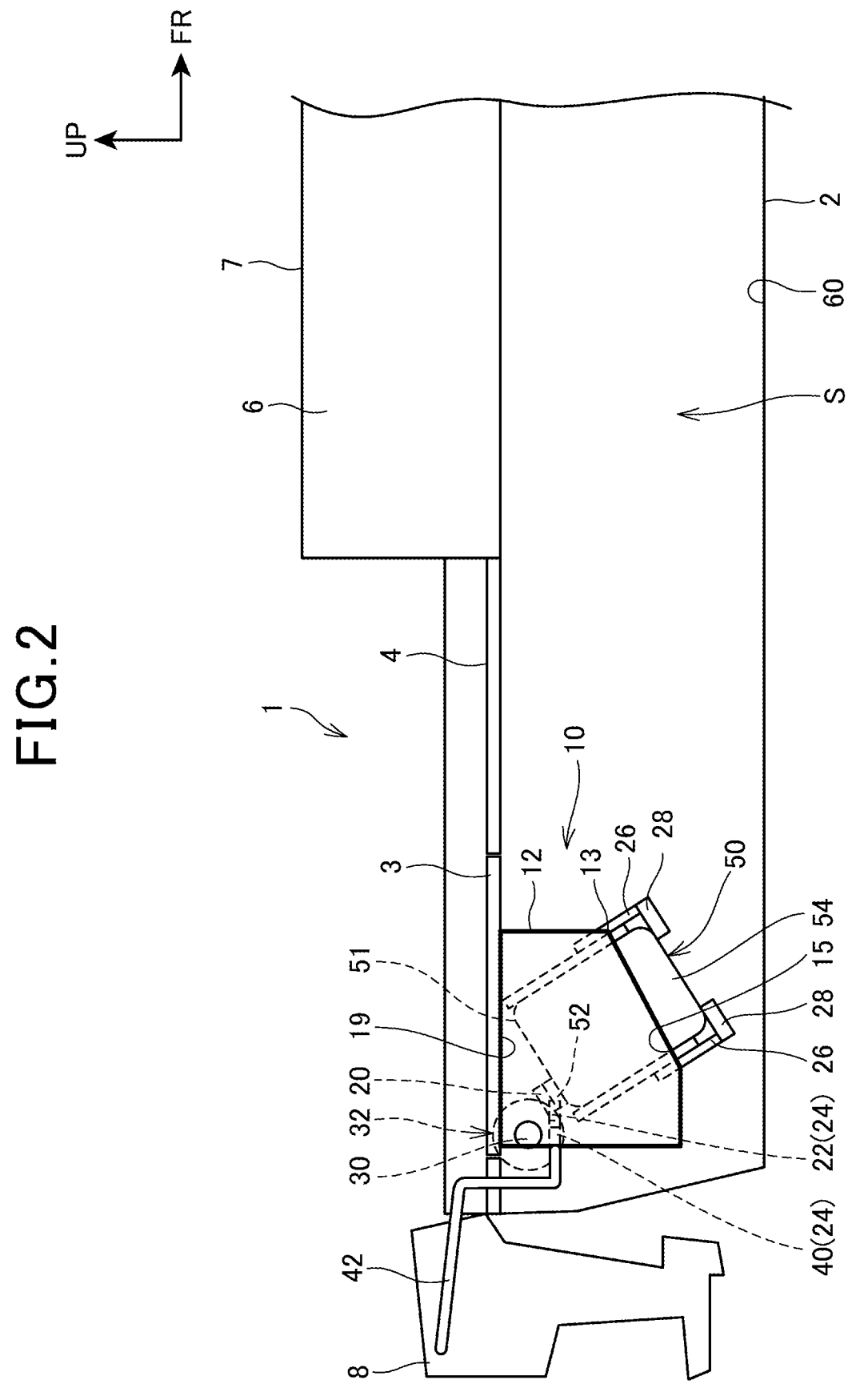
FIG. 2 is a view showing a battery supporting structure, showing a case where a supporting body is positioned below a deck.
Figure 3:
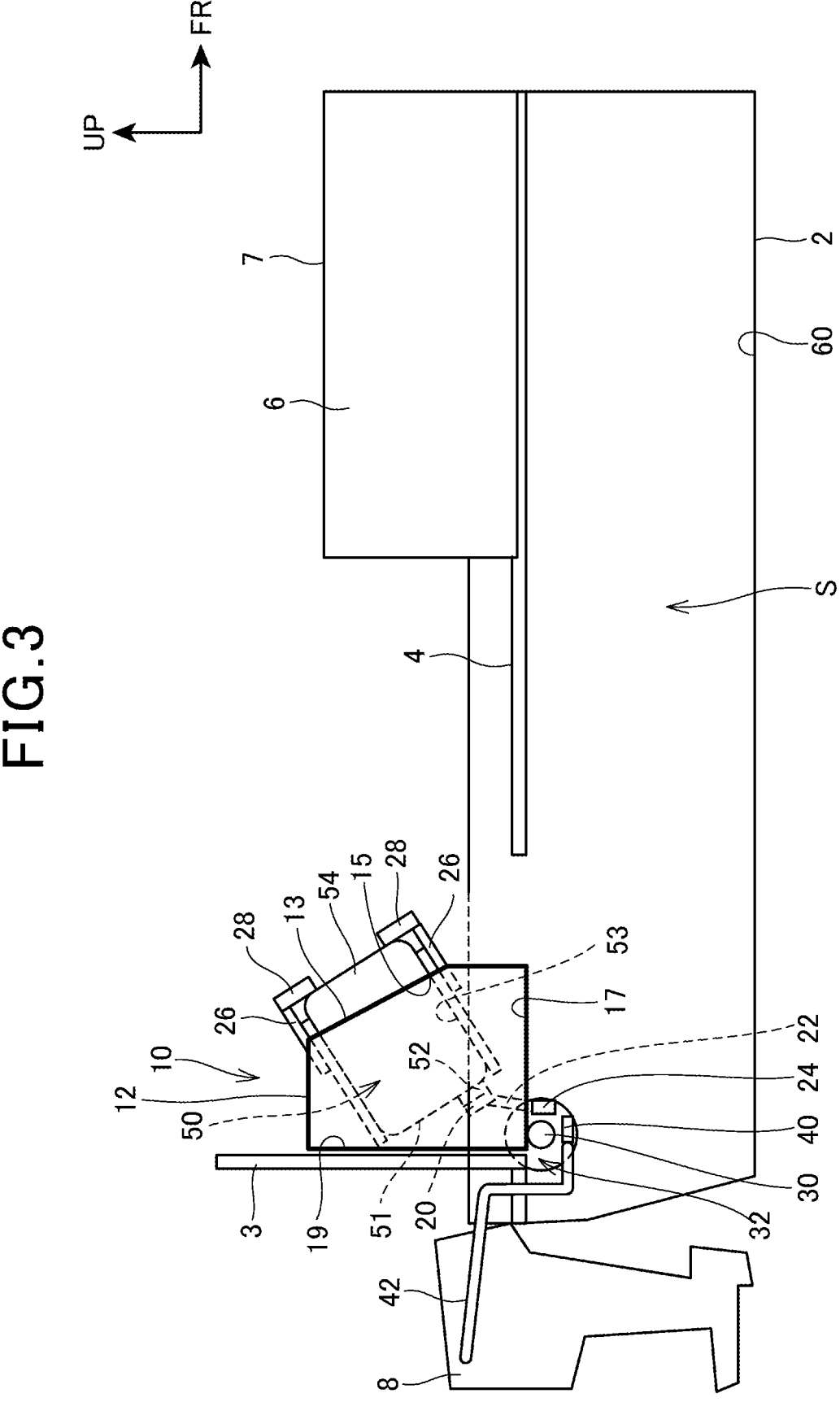
FIG. 3 is a view showing the battery supporting structure, showing a case where at least part of the supporting body is positioned above the deck.

FIG. 2 is a view showing a battery supporting structure 10, showing a case where the supporting body 12 is positioned below the deck 4. FIG. 3 is a view showing a battery supporting structure 10, showing a case where the supporting body 12 is positioned above the deck 4. FIG. 3 is a view as the vessel 1 is viewed from the right.

As shown in FIG. 2 and FIG. 3, the battery supporting structure 10 is provided in the vessel 1. The battery supporting structure 10 is a structure that supports and fixes, to the vessel 1, a battery 50 that supplies electric power for driving the outboard engines 8.

The battery supporting structure 10 includes a supporting body 12. The supporting body 12 is a member that supports the battery 50. In the present embodiment, the supporting body 12 is box-shaped and has an inclined surface 13 formed at a predetermined place.

The supporting body 12 corresponds to a "supporting part" of the present disclosure.

The inclined surface 13 has a supporting opening 15 which is rectangular. Rail bodies 26 as linear rail members are provided at an upper edge and a lower edge of the supporting opening 15. Each rail body 26 has, in its longitudinal direction, one end arranged inside the supporting body 12 and the other end arranged outside the supporting body 12. Namely, each rail body 26 is provided so as to extend from the inside of the supporting body 12 to the outside of the supporting body 12 via the supporting opening 15.

An engaging piece 28 as a claw-like member is provided at the other end of each of the rail bodies 26. The engaging pieces 28 are pivotably provided at the other ends of the rail bodies 26. The engaging pieces 28 pivot from the outside toward the inside of the supporting opening 15.

The supporting body 12 is supported by the panel 3 by a joining side surface 19 being joined onto the lower surface of the panel 3, the joining side surface 19 being one side surface standing from a bottom surface 17 of the supporting body 12. The joining side surface 19 is a side surface facing the inclined surface 13. The joining side surface 19 is provided to stand from the bottom surface 17 of the supporting body 12. The bottom surface 17 is a surface that is positioned at the bottom face of the supporting body 12 when the supporting body 12 is positioned above the deck 4.

The supporting body 12 is fixed to the hull 2 by being pivotably supported on a rotary shaft 30. The rotary shaft 30 is a linear member extending, in the internal space S, along the right-left direction of the vessel 1. The rotary shaft 30 is provided rotatably relative to the hull 2 along the circumferential direction of the rotary shaft 30.

The rotary shaft 30 is joined to a corner formed by the bottom surface 17 and the joining side surface 19 of the supporting body 12.

Thereby, the supporting body 12 is pivotably fixed to the hull 2 with the rotary shaft 30 being as the rotation center.

There is joined to the rotary shaft 30 a rotation mechanism which rotates the rotary shaft 30. The rotation mechanism may be driven manually by the user's manipulation of a handle or the like. Otherwise, the rotation mechanism may be driven, for example, by any of various motive power sources such as a motor.

Figure 4:
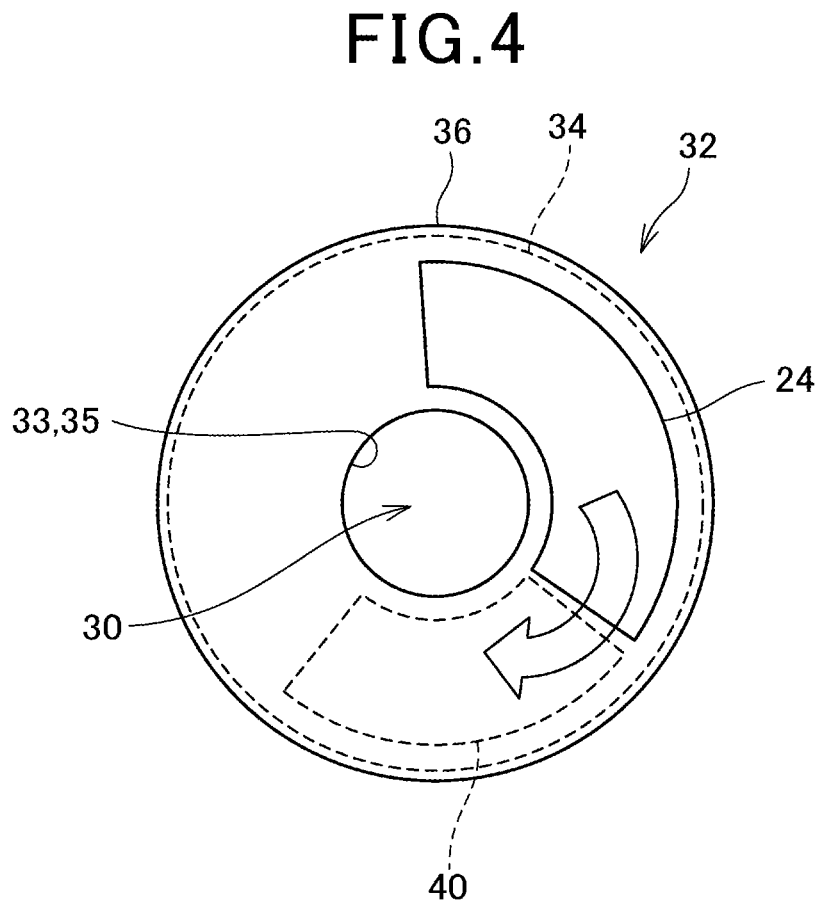

FIG. 4 is a view showing a terminal joining body 32.

The terminal joining body 32 is provided at the rotary shaft 30. As shown in FIG. 4, the terminal joining body 32 is a member having two discs, which are a hull-side disc 34 and a shaft-side disc 36 placed on top of each other. Substantially the centers of the hull-side disc 34 and the shaft-side disc 36 have through holes 33 and 35, respectively, and the rotary shaft 30 is inserted into the through holes 33 and 35.

The hull-side disc 34 is fixed to the hull 2. Therefore, even when the rotary shaft 30 pivots, the hull-side disc 34 does not synchronously rotate.

The shaft-side disc 36 is fixed to the rotary shaft 30. Therefore, when the rotary shaft 30 pivots, the shaft-side disc 36 rotates together with the rotary shaft.

At the hull-side disc 34, a hull terminal 40 as a terminal is provided. The hull terminal 40 is provided at a predetermined place on a plane of the hull-side disc 34, the plane facing the shaft-side disc 36.

The hull terminal 40 corresponds to a "second terminal" of the present disclosure.

At the shaft-side disc 36, a joining terminal 24 as a terminal is provided. The joining terminal 24 is provided on a plane of the shaft-side disc 36, the plane facing the hull-side disc 34.

The joining terminal 24 is arranged, on the plane of the shaft-side disc 36, at a position overlapping with the hull terminal 40 when the supporting body 12 pivots and is positioned below the deck 4, to be connected to the hull terminal 40. In other words, when the supporting body 12 is positioned above the deck 4, the joining terminal 24 and the hull terminal 40 are separated from each other.

Accordingly, the battery supporting structure 10 prevents the battery 50 from discharging when the supporting body 12 has been moved upward, for example, for the purpose of replacement of the battery 50 or other purposes. Therefore, in the vessel 1, it is possible to prevent the battery 50 from discharging except when the outboard engines 8 are driven.

There is provided inside the supporting body 12 a supporting body terminal 20 as a terminal. The supporting body terminal 20 is provided at a position close to the bottom surface 17 of the supporting body 12 and is arranged so as to face the supporting opening 15. The supporting body terminal 20 is provided to be oriented obliquely upward when the supporting body 12 is positioned above the deck 4. Moreover, the supporting body terminal 20 is arranged at a position close to the joining side surface 19.

Accordingly, when the supporting body 12 is positioned above the deck 4, even when sea water or the like enters the inside of the supporting body 12, the supporting body terminal 20 is protected from being immersed in the sea water. Therefore, in the vessel 1, problems regarding power supply by the battery 50, such as short circuit, are prevented.

To the supporting body terminal 20, one end of a bus bar 22 is connected. The bus bar 22 is a linear conductive member. The other end of the bus bar 22 protrudes to the outside of the supporting body 12. To the other end of the bus bar 22, the joining terminal 24 is connected.

Notably, while the supporting body 12 herein includes the bus bar 22, not limitedly, it may include another conductive member such as a wire.

To the hull terminal 40, one end of a power supply line 42 is connected. The power supply line 42 is wiring that connects the hull terminal 40 to the outboard engines 8. The other end of the power supply line 42 is connected to the outboard engines 8.

As mentioned above, the opening 9, the supporting body 12, and the rotary shafts 30 are arranged between the rear end of the hull 2 and the rear end of the cabin 6, that is, on the rear portion of the vessel 1 that is a position close to the outboard engines 8. Thereby, the power supply line 42 can be shortened, and it is possible to simplify wiring in the vessel 1.

The battery 50 is a substantially rectangular solid-shaped power storage device. A battery terminal 52 as a terminal is provided on a bottom surface 51 in one end of the battery 50 in the longitudinal direction. In the present embodiment, the battery terminal 52 is provided at a position close to one side surface 53 standing upward from the bottom surface 51. The battery terminal 52 corresponds to a "first terminal" of the present disclosure.

As shown in FIG. 3, when the supporting body 12 is positioned at uppermost parts within a pivotable range, the panel 3 having been pushed up by the supporting body 12 pivots to uncover the opening 9, and at least part of the supporting body 12 is positioned above the deck 4. More in detail, the inclined surface 13 is entirely positioned above the deck 4.

When the supporting body 12 is positioned uppermost within its pivotable range, the panel 3 having pivoted is arranged so as to stand upward from the deck 4. Accordingly, even when there are sea water, driftage, and/or the like on the upper surface of the panel 3, they are forced to slide on the upper surface of the panel 3, when pivoting, to be moved away from the opening 9. Therefore, even when the panel 3 pivots, sea water or the like is prevented from entering the internal space S through the opening 9.

The user's attaching and detaching the battery 50 to/from the supporting body 12 are performed in the state where the supporting body 12 is positioned uppermost within its pivotable range.

Accordingly, the user can attach/detach the battery 50 to/from the supporting body 12 just on the deck 4 without the need of carrying the battery 50 between above and below the deck 4. Therefore, in the vessel 1, it is possible to improve work efficiency regarding attaching and detaching the battery 50.

When causing the supporting body 12 to support the battery 50, the user inserts the battery 50 through the supporting opening 15 along the rail bodies 26 from the bottom surface 51. In this case, the user inserts the battery 50 through supporting opening 15 such that the one side surface 53 is along the lower edge of the supporting opening 15, that is, such that the battery terminal 52 is to be arranged at a position close to the bottom surface 17. When the battery 50 has been inserted to a predetermined position in the supporting body 12, the battery terminal 52 is connected to the supporting body terminal 20.

When the battery 50 is supported by the supporting body 12, the other end 54 of the battery 50 protrudes upward obliquely from the supporting opening 15 toward the front portion of the vessel 1. Namely, the end 54 protrudes to the outside of the supporting body 12. The user can attach/detach the battery 50 to/from the supporting body 12 by gripping the end 54. Notably, handles or the like may be provided at the end 54.

After the battery 50 is supported by the supporting body 12, the end 54 is pressed by the engaging pieces 28 having pivoted. Thereby, the battery 50 is fixed to the supporting body 12.

As mentioned above, the supporting body 12 supports the battery 50 so as to protrude upward obliquely toward the front portion of the vessel 1. Accordingly, in the battery supporting structure 10, the battery 50 and the supporting opening 15 are arranged so as to face the user on the deck 4. Therefore, the battery supporting structure 10 can improve work efficiency regarding attaching and detaching the battery 50.

After the battery 50 is fixed to the supporting body 12, the user drives the rotation mechanism to move the supporting body 12 up to below the deck 4. When the supporting body 12 is positioned at the lowermost parts within the pivotable range of the supporting body 12, each of the supporting body 12 and the battery 50 is entirely positioned below the deck 4.

Accordingly, in the vessel 1, the supporting body 12 and the battery 50 can be contained below the deck 4 when the battery 50 supplies electric power. Therefore, in the vessel 1, a space above the deck 4 can be prevented from decreasing, and the center of gravity of the vessel 1 can be prevented from rising.

When the supporting body 12 moves to the lowermost parts within the movable range of the supporting body 12, the joining terminal 24 and the hull terminal 40 are connected with each other. Accordingly, in the vessel 1, electric power can be supplied to the outboard engines 8 from the battery 50.

As described above, according to the present embodiment, the battery supporting structure 10 provided in the vessel 1 includes the supporting body 12 which supports the battery 50, and the supporting body 12 is movable between above and below the deck 4 by rotating around the rotary shaft.

Accordingly, in the vessel 1, the battery 50 can be moved between above and below the deck 4. Therefore, in the vessel 1, it is possible to improve work efficiency regarding attaching and detaching the battery 50.

Moreover, according to the present embodiment, the supporting body 12 is movable upward to a position where at least part of the battery 50 is positioned above the deck 4.

Accordingly, the user can attach/detach the battery 50 to/from the supporting body 12 just on the deck 4 without the need of carrying the battery 50 between above and below the deck 4. Therefore, in the vessel 1, it is possible to improve work efficiency regarding attaching and detaching the battery 50.

Moreover, according to the present embodiment, the supporting body 12 is movable downward to a position where the supporting body 12 is entirely positioned below the deck 4.

Accordingly, in the vessel 1, the supporting body 12 and the battery 50 can be contained below the deck 4 when the battery 50 supplies electric power. Therefore, in the vessel 1, a space above the deck 4 can be prevented from decreasing, and the center of gravity of the vessel 1 is prevented from rising.

Moreover, according to the present embodiment, the battery terminal 52 is provided at the battery 50, and the supporting body 12 supports the battery 50 in a direction in which the end 54 of the battery 50 is to intersect the deck 4 when the supporting body 12 is positioned above the deck 4, the supporting body 12 supporting the battery 50 such that the end 54 is positioned above the battery terminal 52 when the supporting body 12 is positioned above the deck 4, the end 54 being positioned on the opposite side to the battery terminal 52.

Accordingly, in the battery supporting structure 10, the battery 50 and the supporting opening 15 are arranged so as to face the user on the deck 4. Therefore, with the battery supporting structure 10, it is possible to improve work efficiency regarding attaching and detaching the battery 50.

Moreover, according to the present embodiment, the hull terminal 40 is provided in the vessel 1, and the battery terminal 52 and the hull terminal 40 are connected with each other when the supporting body 12 is positioned below the deck 4.

Accordingly, the battery supporting structure 10 prevents the battery 50 from discharging when the supporting body 12 has been moved upward, for example, for the purpose of replacement of the battery 50 or other purposes. Therefore, in the vessel 1, it is possible to prevent the battery 50 from discharging except when the outboard engines 8 are driven.

Moreover, according to the present embodiment, the rotary shaft 30 is provided below the deck 4.

Accordingly, in the vessel 1, the rotary shaft 30 can be contained below the deck 4. Therefore, in vessel 1, a space above the deck 4 can be prevented from decreasing.

The aforementioned embodiment is an example of an aspect of the present invention and any modifications and applications thereof may occur without departing from the spirit of the present invention.

While in the aforementioned embodiment, the supporting body 12 is a box-shaped member, not limitedly, it may be any member as long as it has a shape in which the battery 50 can be held, such, for example, as a pillar shape, a hook shape, or a frame shape.

The supporting body 12 may be formed to be capable of supporting a plurality of batteries 50. In this case, there may be connected to the hull terminal 40 all of the conductive members such as bus bars 22 and joining terminals 24 connected to the respective batteries 50. Namely, the hull terminal 40 may be a terminal that functions as a so-called centralized terminal. Accordingly, in the vessel 1, it is possible to simplify the wiring for the vessel 1 and the battery supporting structure 10.

While in the aforementioned embodiment, the battery 50 supplies electric power to the outboard engines 8, not limitedly, it may supply electric power to other electric fittings such as a winch and a sonar.

The directions such as horizontal one and vertical one and the various shapes in the aforementioned embodiment are intended to include their equivalents that attain the same effects as those directions and shapes do (so-called equivalent ranges), unless otherwise noted.

[Configurations Supported by the Aforementioned Embodiment]

The aforementioned embodiment supports the following configurations.

(Configuration 1) A battery supporting structure to be provided in a vessel, the battery supporting structure including a supporting part that supports a battery, wherein the supporting part is movable between below and above a deck of the vessel by rotating around a rotary shaft provided in the vessel.

According to this configuration, in the vessel, the battery can be moved between above and below the deck. Therefore, in the vessel, it is possible to improve work efficiency regarding attaching and detaching the battery.

(Configuration 2) The supporting structure according to Configuration 1, wherein the supporting part is movable upward to a position where at least part of the battery is positioned above the deck.

According to this configuration, the user can attach/detach the battery to/from the supporting part just on the deck without the need of carrying the battery between above and below the deck. Therefore, in the vessel, it is possible to improve work efficiency regarding attaching and detaching the battery.

(Configuration 3) The supporting structure according to Configuration 1, wherein the supporting part is movable downward to a position where the supporting part is entirely positioned below the deck.

According to this configuration, in the vessel, the supporting part and the battery can be contained below the deck when the battery supplies electric power. Therefore, in the vessel, a space above the deck can be prevented from decreasing, and the center of gravity of the vessel can be prevented from rising.

(Configuration 4) The battery supporting structure according to any one of Configuration 1 to Configuration 3, wherein a first terminal is provided at the battery, and the supporting part supports the battery in a direction in which an end of the battery is to intersect the deck when the supporting part moves above the deck, the supporting part supporting the battery such that the end is positioned above the first terminal when the supporting part moves above the deck, the end being positioned on an opposite side to the first terminal.

According to this configuration, in the battery supporting structure, the battery and the supporting opening 15 are arranged so as to face the user on the deck. Therefore, with the battery supporting structure, it is possible to improve work efficiency regarding attaching and detaching the battery.

(Configuration 5) The supporting structure according to Configuration 4, wherein a second terminal is provided in the vessel, and the first terminal and the second terminal are connected with each other when the supporting part is positioned below the deck.

According to this configuration, the battery supporting structure prevents the battery from discharging when the supporting part has been moved upward, for example, for the purpose of replacement of the battery or other purposes. Therefore, in the vessel, it is possible to prevent the battery from discharging except when the battery supplies electric power to a predetermined fitting.

(Configuration 6) The battery supporting structure according to any one of Configuration 1 to Configuration 5, wherein the second terminal is provided at a position closer to the deck than to a bottom surface of a hull of the vessel.

According to this configuration, in the vessel 1, the rotary shaft can be contained below the deck. Therefore, in the vessel, a space above the deck can be prevented from decreasing.

REFERENCE SIGNS LIST

1 Vessel
2 Hull
3 Panel
4 Deck
10 Battery supporting structure
12 Supporting body (supporting part)
30 Rotary shaft
40 Hull terminal (second terminal)
50 Battery
52 Battery terminal (first terminal)
54 End
60 Bottom surface

What is claimed is:

1. A battery supporting structure to be provided in a moving body, the battery supporting structure comprising:
a supporting part that supports a battery,
wherein the supporting part rotates around a rotary shaft provided in the moving body so as to move reciprocally between a first position below a flat plate and a second position where at least a portion of the battery is above the flat plate, the flat plate forms an upper surface of the moving body and covers an internal space of the moving body,
the supporting part is in a box-shape and has an opening for inserting and removing the battery into and from the supporting part, and
the opening is provided so as to face downward, relative to a virtual horizontal plane of the moving body including a plane of the flat plate, when the supporting part is located at the first position, and so as to face upward, relative to the virtual horizontal plane of the moving body, when the supporting part is located at the second position.

2. The battery supporting structure according to claim 1, wherein the supporting part is movable upward to the second position where the battery is entirely positioned above the flat plate.

3. The battery supporting structure according to claim 1, wherein the supporting part is movable downward to a position where the supporting part is entirely positioned below the flat plate.

4. The battery supporting structure according to claim 1, wherein a first terminal is provided on the battery, and when the battery is inserted to a predetermined position in the supporting part, the first terminal is connected to a second terminal provided at the supporting part.

5. The battery supporting structure according to claim 1, wherein the rotary shaft is provided below the flat plate.

6. The battery supporting structure according to claim 4, wherein when the supporting part is positioned at the first position while the first terminal and the second terminal are connected to each other, the first terminal, the second terminal and a third terminal provided in the moving body are electrically connected to each other.

7. The battery supporting structure according to claim 1, wherein the supporting part includes a joining portion that is formed by a bottom surface of the supporting part when the supporting part is positioned at the second position and a joining side surface that is connected to the bottom surface, the joining portion is joined to the rotary shaft to pivotably fix the supporting part to the rotary shaft.

8. The battery supporting structure according to claim 7, wherein the opening and the joining portion are provided at positions facing each other.

9. The battery supporting structure according to claim 1, wherein the battery has a first end that is inserted, through the opening, into the supporting part, and a second end that is positioned opposite to the first end, wherein the battery is supported by the supporting part while the second end protrudes from the opening to an outside of the supporting part.

10. The battery supporting structure according to claim 9, wherein the opening of the supporting part is provided with a rail body, one end of the rail body being arranged inside the supporting part and the other end of the rail body being arranged outside the supporting part, the rail body being a linear rail member which assists the battery being inserted into and removed from an inside of the supporting part.

11. The battery supporting structure according to claim 10, wherein an engaging piece is provided at the other end of the rail body, the engaging piece is provided pivotably relative to the rail body, and the battery inserted into the inside of the supporting part along the rail body is fixed to the supporting part by pressing the second end protruding from the opening to the outside of the supporting part with the engaging piece.

12. The battery supporting structure according to claim 6, wherein when the supporting part is positioned at the second position, the first terminal and the third terminal are electrically disconnected from each other.

* * * * *